(12) United States Patent　(10) Patent No.: US 12,141,260 B2
Aoki　(45) Date of Patent: Nov. 12, 2024

(54) AUTHENTICATION DEVICE, AUTHENTICATION METHOD, AND RECORDING MEDIUM

(71) Applicant: NEC Corporation, Tokyo (JP)

(72) Inventor: Momotaka Aoki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 245 days.

(21) Appl. No.: 17/912,212

(22) PCT Filed: Mar. 26, 2020

(86) PCT No.: PCT/JP2020/013584
§ 371 (c)(1),
(2) Date: Sep. 16, 2022

(87) PCT Pub. No.: WO2021/192134
PCT Pub. Date: Sep. 30, 2021

(65) Prior Publication Data
US 2023/0252119 A1　Aug. 10, 2023

(51) Int. Cl.
*G06F 21/32* (2013.01)
*G06V 10/60* (2022.01)
*G06V 40/16* (2022.01)
*G06V 40/18* (2022.01)
*H04N 23/23* (2023.01)

(52) U.S. Cl.
CPC ............ *G06F 21/32* (2013.01); *G06V 10/60* (2022.01); *G06V 40/172* (2022.01); *G06V 40/193* (2022.01); *G06V 40/197* (2022.01); *H04N 23/23* (2023.01)

(58) Field of Classification Search
CPC .... G06F 21/32; G06V 40/197; G06V 40/172; G06V 10/60; G06V 40/193; H04N 23/23

USPC ......................................................... 713/186
See application file for complete search history.

(56) References Cited

U.S. PATENT DOCUMENTS

| 9,152,850 B2 * | 10/2015 | Mogi .................... G06V 40/70 |
| 11,727,098 B2 * | 8/2023 | Tussy ............... G06Q 20/40145 |
| | | 726/6 |
| 2001/0021979 A1 * | 9/2001 | Ito ...................... H04N 1/32144 |
| | | 713/189 |

(Continued)

FOREIGN PATENT DOCUMENTS

| JP | 2004-318248 A | 11/2004 |
| JP | 2005-004524 A | 1/2005 |

(Continued)

OTHER PUBLICATIONS

International Search Report for PCT Application No. PCT/JP2020/013584, mailed on Jun. 23, 2020.

*Primary Examiner* — Thanh T Le
(74) *Attorney, Agent, or Firm* — Sughrue Mion, PLLC

(57) ABSTRACT

In an authentication device, an image conversion unit converts a visible light image obtained by capturing a region including an iris of a subject in visible light, and generates a converted image. For example, the image conversion unit converts the visible light image into a monochrome image. A feature value extraction unit extracts a feature value of the converted image. A collation unit performs authentication of the subject by collating the feature value extracted from the converted image with a feature value generated from an infrared image of an iris.

13 Claims, 7 Drawing Sheets

(56) References Cited

U.S. PATENT DOCUMENTS

| | | | |
|---|---|---|---|
| 2006/0165265 A1* | 7/2006 | Fujimatsu | G06V 40/19 382/117 |
| 2015/0100493 A1* | 4/2015 | Carnesi, Sr. | G06Q 20/40145 348/78 |
| 2016/0085565 A1* | 3/2016 | Arcese | H04L 63/0861 726/7 |
| 2019/0149335 A1* | 5/2019 | Kim | G09C 5/00 713/155 |
| 2019/0340349 A1* | 11/2019 | Kong | G06F 21/32 |
| 2019/0362130 A1* | 11/2019 | Othman | G06V 40/1371 |
| 2020/0125832 A1* | 4/2020 | Zhang | G06T 7/557 |
| 2020/0151425 A1* | 5/2020 | Zhou | G06V 40/45 |
| 2021/0042401 A1* | 2/2021 | Nagai | G06T 7/521 |
| 2022/0172537 A1* | 6/2022 | Lee | G06V 40/16 |

FOREIGN PATENT DOCUMENTS

| | | |
|---|---|---|
| JP | 2005-071009 A | 3/2005 |
| JP | 2019-128630 A | 8/2019 |
| WO | 2019/150807 A1 | 8/2019 |

* cited by examiner

AUTHENTICATION DEVICE, AUTHENTICATION METHOD, AND RECORDING MEDIUM

This application is a National Stage Entry of PCT/JP2020/013584 filed on Mar. 26, 2020, the contents of all of which are incorporated herein by reference, in their entirety.

TECHNICAL FIELD

This disclosure relates to iris authentication.

BACKGROUND ART

Iris authentication is known as a method of biometric authentication. Since effects of corneal reflection, racial difference, and the like exist in an image captured by a visible light, an image captured by an infrared camera is generally used for an image used in iris authentication. On the other hand, Patent Document 1 proposes a technique that uses a color image captured by a color video camera.

PRECEDING TECHNICAL REFERENCES

Patent Document

Patent Document 1: Japanese Patent Application Laid-Open under No. 2004-318248

SUMMARY

Problem to be Solved

However, according to the technique of Patent Document 1, registered feature values to be used in collation are also prepared based on color image data. Accordingly, previously accumulated feature values of infrared images cannot be used, and feature values for collation need to be newly generated.

It is an example object of this disclosure to provide an authentication device that makes it possible to perform iris authentication by using a feature value extracted from a visible light image.

Means for Solving the Problem

According to an example aspect of this disclosure, there is provided an authentication device including:

an image conversion unit configured to convert a visible light image and generate a converted image, the visible light image obtained by capturing a region including an iris of a subject in visible light:

a feature value extraction unit configured to extract a feature value of the converted image; and a collation unit configured to perform authentication of the subject by collating the extracted feature value with a feature value generated from an infrared image of an iris.

According to another example aspect of this disclosure, there is provided an authentication method including:

converting a visible light image and generating a converted image, the visible light image obtained by capturing a region including an iris of a subject in visible light:

extracting a feature value of the converted image; and performing authentication of the subject by collating the extracted feature value with a feature value generated from an infrared image of an iris.

According to still another example aspect of this disclosure, there is provided a recording medium recording a program, the program causing a computer to execute processing including:

converting a visible light image and generating a converted image, the visible light image obtained by capturing a region including an iris of a subject in visible light:

extracting a feature value of the converted image; and performing authentication of the subject by collating the extracted feature value with a feature value generated from an infrared image of an iris.

Effect

According to this disclosure, it is possible to perform iris authentication by using a feature value extracted from a visible light image.

EXAMPLE EMBODIMENTS

Hereinafter, preferred example embodiments of this disclosure will be described with reference to the drawings.

First Example Embodiment

[Authentication System]

Figure 1:
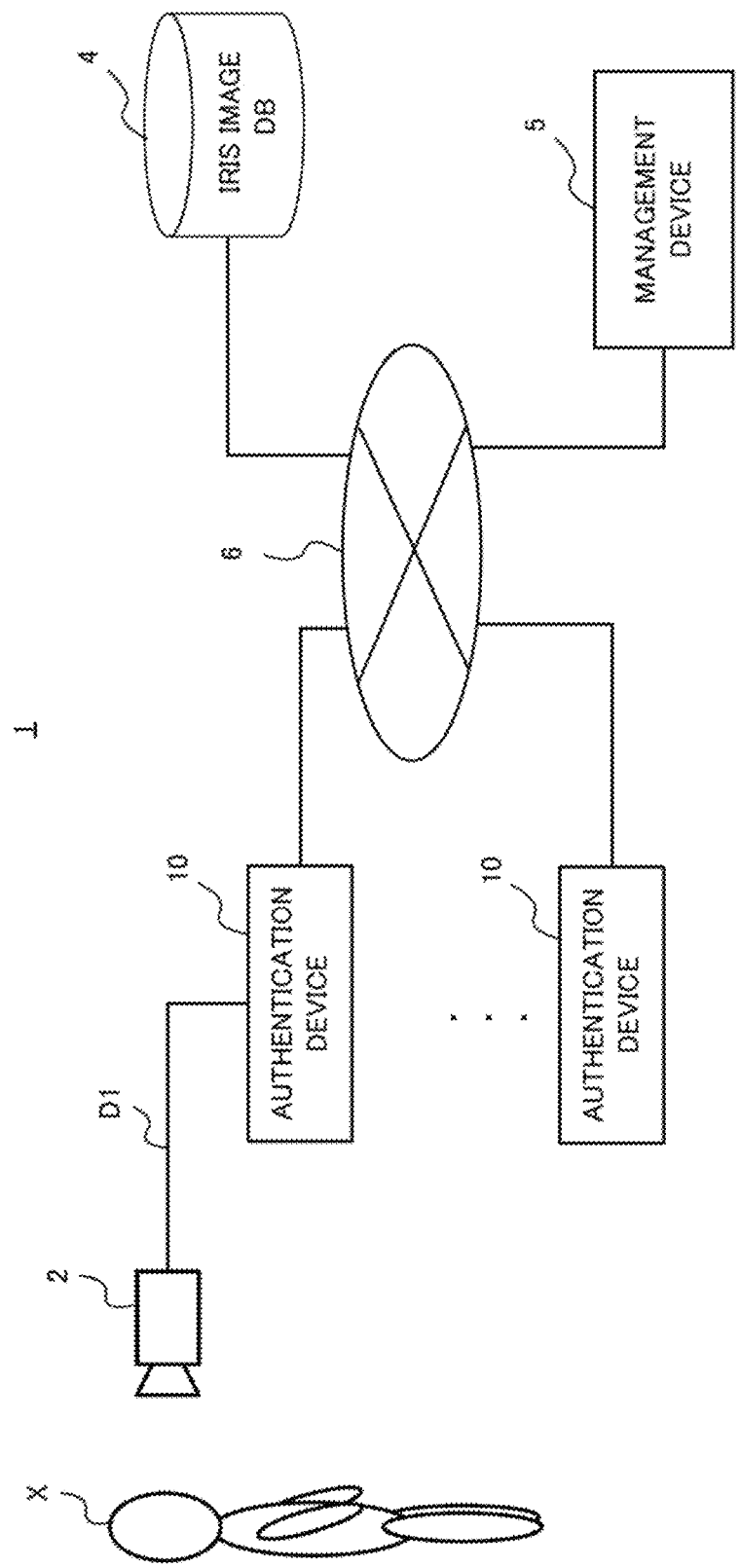
FIG. 1 shows a schematic configuration of an authentication system to which an authentication device according to a first example embodiment is applied.

FIG. 1 shows a schematic configuration of an authentication system to which an authentication device according to a first example embodiment is applied. The authentication system 1 includes a visible light camera 2, one or more authentication devices 10, an iris image database (hereinafter, "database" is also abbreviated to "DB") 4, and a management device 5. Each authentication device 10 is connected to the corresponding visible light camera 2. Moreover, each authentication device 10, the iris image DB 4, and the management device 5 are connected through a network 6.

The visible light camera 2 captures a visible light image of a face of a subject X of iris authentication. As the visible light camera 2, a camera that captures general color images can be used. The visible light camera 2 outputs the captured visible light image D1 to the authentication device 10.

The iris image DB 4 stores an infrared image of an iris of a specific person (hereinafter referred to as "registered person"), which is captured by using an infrared camera, and a feature value extracted from the infrared image (hereinafter also referred to as "registered feature value"). Note that the iris image DB 4 may further store, for example, gender, age, nationality, and other attribute information of each registered person.

The authentication device 10 performs iris authentication of the subject X by using the visible light image D1 inputted from the visible light camera 2 and the registered feature values stored in the iris image DB 4. Each registered feature value stored in the iris image DB 4 is a feature value extracted by applying a predetermined feature extraction method to an infrared image obtained by capturing an iris of a registered person. In the present example embodiment, Daugman's algorithm or any of other various algorithms can be used for the feature extraction method.

The management device 5 is a device used by an administrator or the like of the authentication system 1. The management device 5 includes a display device, and displays a result of authentication by each authentication device 10. For example, the management device 5 can display a list of results of authentication by the individual authentication devices 10, or can display details of a result of authentication by a single authentication device 10 selected by the administrator.

[Hardware Configuration of Authentication Device]

Figure 2:
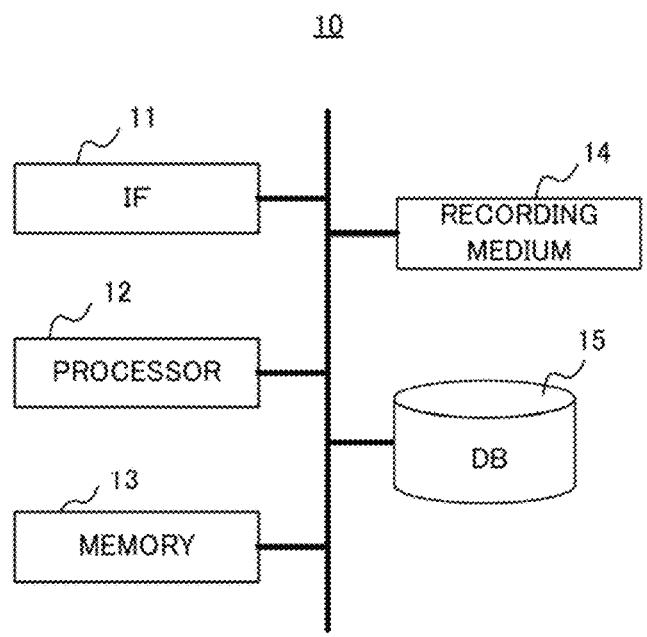
FIG. 2 is a block diagram showing a hardware configuration of the authentication device.

FIG. 2 is a block diagram showing a hardware configuration of the authentication device. The authentication device 10 includes an IF (InterFace) 11, a processor 12, a memory 13, a recording medium 14, and a database (DB) 15.

The IF 11 receives and outputs data. Specifically, the IF 11 acquires the visible light image D1 obtained by capturing the face of the subject X from the visible light camera 2, and outputs the result of authentication generated by the authentication device 10 based on the visible light image D1, to the management device 5.

The processor 12 is a computer such as a central processing unit (CPU) or a graphics processing unit (GPU), and controls the whole authentication device 10 by executing a program that is prepared beforehand. Particularly, the processor 12 performs iris authentication processing, which will be described later.

The memory 13 includes a read only memory (ROM), a random access memory (RAM), and the like. The memory 13 stores various programs to be executed by the processor 12. The memory 13 is also used for a working memory while various processing is being executed by the processor 12.

The recording medium 14 is a non-volatile, non-transitory recording medium, such as a disk recording medium or a semiconductor memory, and is configured to be removable from the authentication device 10. Various programs to be executed by the processor 12 are recorded on the recording medium 14.

The DB 15 stores the visible light images D1 inputted from the IF 11. Moreover, the DB 15 stores information related to a plurality of algorithms for image conversion of the visible light image D1, which will be described later. In addition, the authentication device 10 may also include an input unit and a display unit that are used when the administrator makes necessary settings and the like.

[Functional Configuration]

Figure 3:
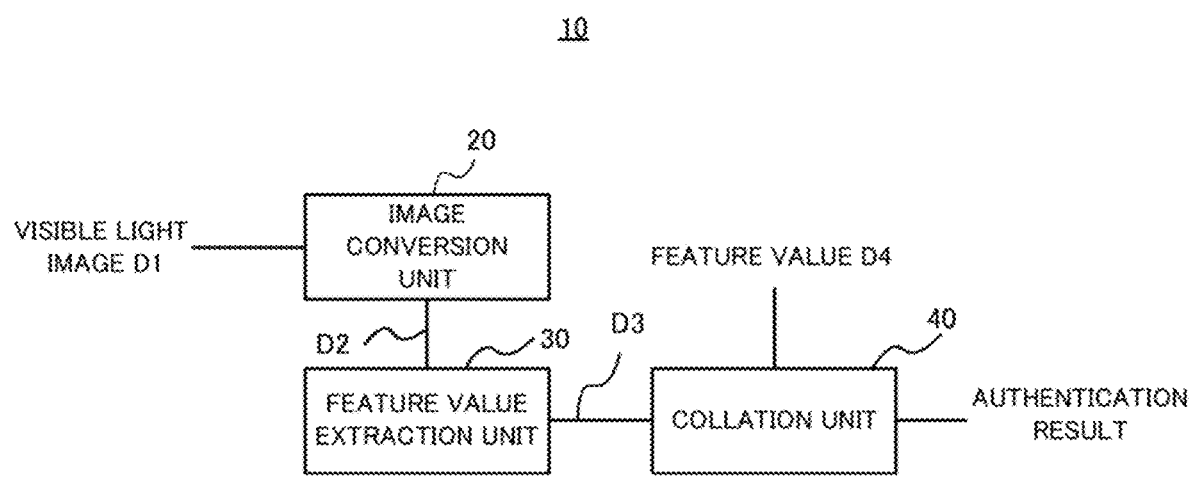
FIG. 3 is a block diagram showing a functional configuration of the authentication device.

FIG. 3 is a block diagram showing a functional configuration of the authentication device 10. The authentication device 10 includes an image conversion unit 20, a feature value extraction unit 30, and a collation unit 40. The visible light image D1 of the face of the subject X is inputted from the visible light camera 2 to the image conversion unit 20. The image conversion unit 20 clips a region of an eye out of the visible light image D1 of the entire face of the subject X, and generates a monochrome image by performing monochrome conversion. The image conversion unit 20 then outputs the obtained monochrome image, as a monochrome converted image D2, to the feature value extraction unit 30. The feature value extraction unit 30 extracts a feature value D3 by applying a predetermined feature extraction method to the monochrome converted image D2. Incidentally, the feature value extraction method used by the feature value extraction unit 30 is basically the same as the method used when the registered feature value stored in the iris image DB 4 is extracted. As described earlier, the iris image DB 4 stores the registered feature value that is generated by using a certain feature value extraction method with respect to an infrared image of an iris of the registered person, and the feature value extraction unit 30 basically uses the same feature value extraction method to extract the feature value D3 from the monochrome converted image D2. Hereinafter, for convenience of description, the feature value D3 extracted by the feature value extraction unit 30 is also referred to as "extracted feature value D3". The feature value extraction unit 30 outputs, to the collation unit 40, the extracted feature value D3 thus generated.

The collation unit 40 acquires a registered feature value D4 of a registered person from the iris image DB 4 via the network 6, and collates the extracted feature value D3 generated by the feature value extraction unit 30 with the registered feature value D4. Now, it is assumed to be determined whether or not the subject X belongs to the registered persons. In such a case, the collation unit 40 collates the extracted feature value D3 with a registered feature value D4 of a certain registered person, and calculates a score of matching degree (or degree of similarity). When the score is equal to or higher than a predetermined value, the collation unit 40 determines that the subject X is the registered person. When the score obtained by the comparison is lower than the predetermined value, the collation unit 40 determines that the subject X is not the registered person. The collation unit 40 transmits an authentication result thus obtained to the management device 5.

Figure 4:
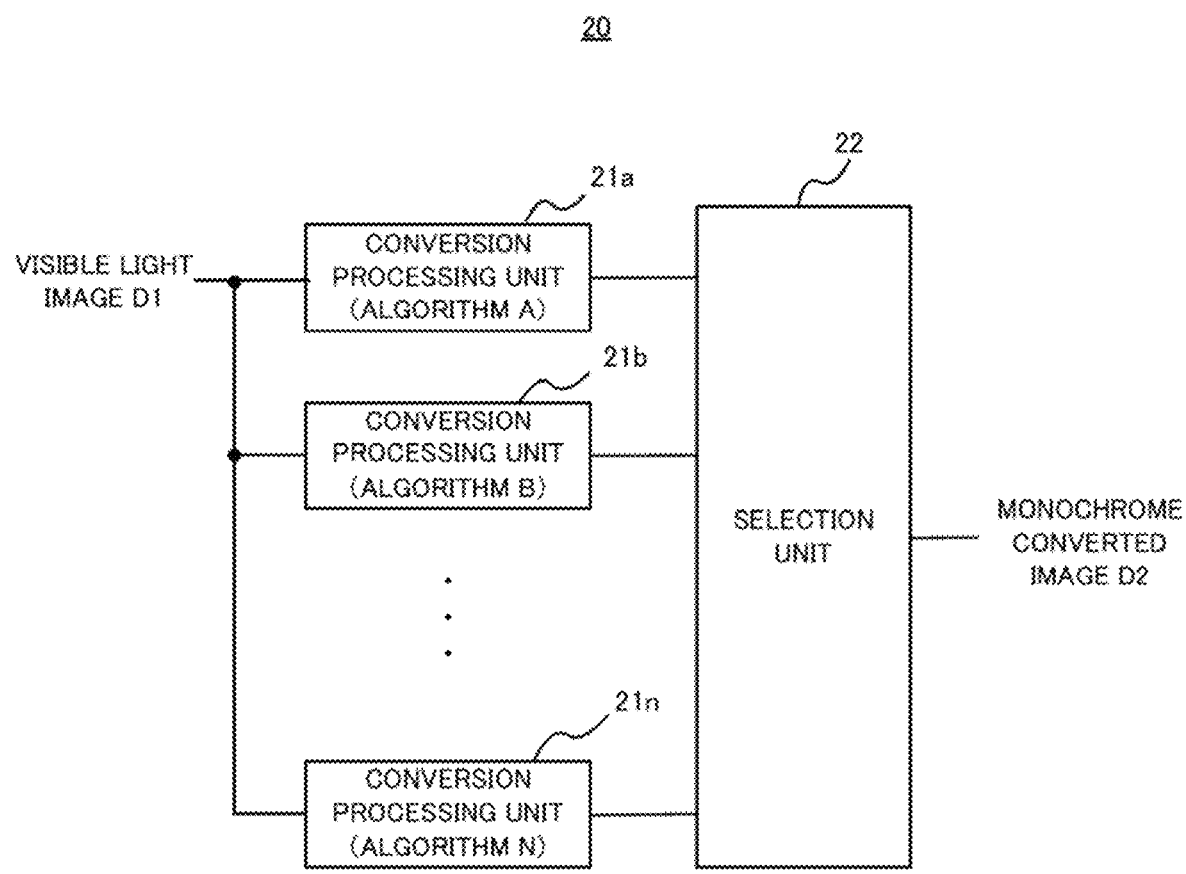
FIG. 4 is a block diagram showing a functional configuration of an image conversion unit.

Next, the image conversion unit 20 is described in detail. FIG. 4 is a block diagram showing a functional configuration of the image conversion unit 20. The image conversion unit 20 includes a plurality of conversion processing units 21 and a selection unit 22. The plurality of conversion processing units 21 perform monochrome conversion of the visible light image D1 by using different image conversion algorithms, respectively. For example, in the example in FIG. 4, the conversion processing unit 21a performs image conversion by using an image conversion algorithm A, and the conversion processing unit 21b performs image conversion by using an image conversion algorithm B. Each conversion processing unit 21 outputs a converted image to the selection unit 22. The selection unit 22 selects one image from the plurality of input images, and outputs the selected image, as the monochrome converted image D2, to the feature value extraction unit 30.

Next, a method for selecting the monochrome converted image D2 by the selection unit 22 is described. Among the plurality of input images, the selection unit 22 outputs an image with the highest quality value, as the monochrome converted image D2. Here, in one example, an image with the highest quality value is assumed to be an image in which a feature value used in iris authentication well appears, more specifically, an image including a wide area from which the feature value can be extracted. In this case, the selection unit 22 calculates a feature value for each of the plurality of input images by using the same feature extraction method as the feature value extraction unit 30 used in a subsequent stage, and selects an image in which the feature value of the iris best appears, as the monochrome converted image D2. Thus, image conversion can be performed by a method that has a highest capability to extract a feature value, and authentication accuracy can be enhanced.

In another example, an image with the highest quality value is an image in which contrast between dark and light parts is clear. In this a case, the selection unit 22 calculates differences between adjacent pixel values, based on each pixel value included in each of the plurality of input images, and selects an image with a large difference in the entire image, as the monochrome converted image D2. Incidentally, instead of calculating the differences between individual pixel values, an entire image may be divided into a plurality of blocks, and differences between the mean values, the maximum values, the minimum values, or the like of pixel values of the individual blocks may be used. Also, the selection unit 22 may calculate an index indicating a contrast of each image, and may select an image with the largest index value as the monochrome converted image D2.

[Iris Authentication Processing]

Figure 5:
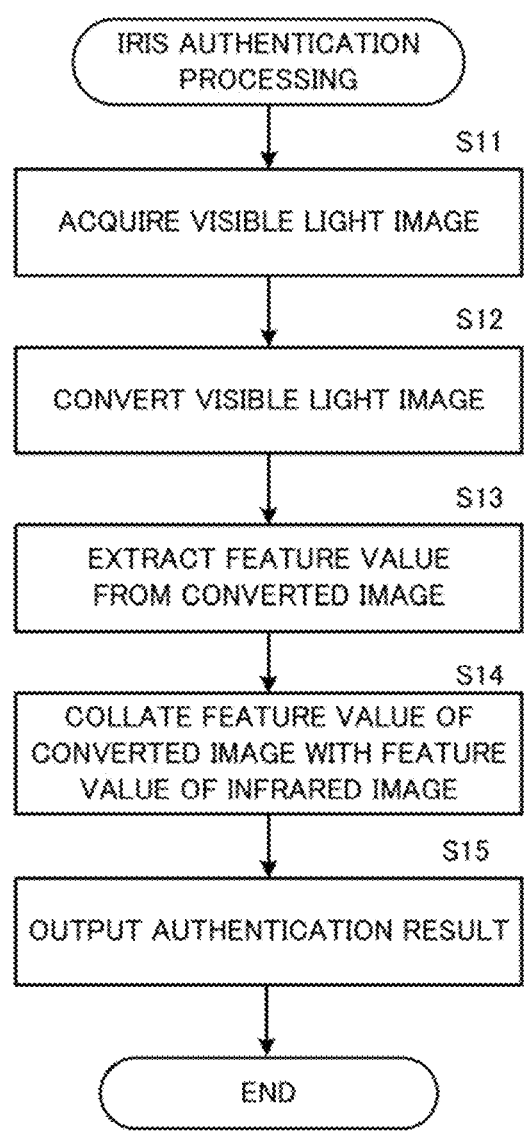
FIG. 5 is a flowchart of iris authentication processing performed by the authentication device.

FIG. 5 is a flowchart of the iris authentication processing performed by the authentication device 10. The processing is implemented by the processor 12 shown in FIG. 2, which executes the program prepared beforehand.

First, the visible light camera 2 captures an image of the subject X, and the authentication device 10 acquires the visible light image D1 of the subject X from the visible light camera 2 (step S11). The image conversion unit 20 performs image conversion of the visible light image D1 to a monochrome image, and outputs the generated monochrome converted image D2 to the feature value extraction unit 30 (step S12). The feature value extraction unit 30 extracts the feature value D3 from the monochrome converted image D2 by using the predetermined feature value extraction method, and outputs the extracted feature value D3 to the collation unit 40 (step S13).

The collation unit 40 sequentially acquires registered feature values D4 of a plurality of registered persons from the iris image DB 4, collates the feature value D3 extracted from the monochrome converted image D2 with each of the registered feature values D4 (step S14), and outputs an authentication result (step S15). For example, when the score of matching degree obtained by comparing the feature value D3 of the subject X with a registered feature value D4 of a certain registered person is equal to or higher than a predetermined value, the collation unit 40 determines that the subject X is the registered person. Then, the processing is terminated.

As described above, in the present example embodiment, iris authentication is performed by converting a visible light image D1 of a subject X to a monochrome image, extracting a feature value from the monochrome image, and comparing the feature value with the feature values registered in the iris image DB 4. Thus, a need to use an infrared camera, which was conventionally needed, is eliminated, and a system cost can be reduced.

[Other Methods for Selecting Image Conversion Algorithm]

In the above-described example embodiment, in the image conversion unit 20, the plurality of conversion processing units 21 perform monochrome conversion of the visible light image D1 by using the different image conversion algorithms, and the selection unit 22 selects an image with the highest quality value, as the monochrome converted image D2, from among the obtained images. Instead of such a method, the image conversion unit 20 may select an image conversion algorithm by one of the following methods.

(First Method)

In a first method, based on an image capture condition of the infrared image stored in the iris image DB 4, the selection unit 22 selects an image conversion algorithm suitable for the image capture condition. Since each registered feature value D4 stored in the iris image DB 4 is generated by performing feature value extraction with respect to an infrared image obtained by capturing an iris of a registered person, it is effective to tune the monochrome converted image D2 side to the same image capture condition. As specific processing, an image capture condition for an infrared image from which a registered feature value D4 stored in the iris image DB 4 derives is set in the authentication device 10. The selection unit 22 selects an optimal image conversion algorithm based on the image capture condition, and selects an image converted by using the image conversion algorithm as the monochrome converted image D2. In such a method, monochrome conversion of the visible light image D1 may be performed by one conversion processing unit 21 that uses the image conversion algorithm selected based on the image capture condition, among the plurality of conversion processing units 21 shown in FIG. 4.

More specifically, when an image capture condition for an infrared image stored in the iris image DB 4 is stored as attribute information or the like, the selection unit 22 selects an image conversion algorithm suitable for the image capture condition. Incidentally, even if the image capture condition is not stored in the iris image DB 4, if the image capture condition is known, the image capture condition may be used. For example, when it is known that all the registered feature values stored in a certain iris image DB 4 are captured in the same room and under the same lighting condition, the selection unit 22 may select an image conversion algorithm suitable for such an image capture condition.

For an image capture condition, for example, a lighting condition at a time of capturing an image, camera performance (resolution, focus performance), or the like can be used. In actuality, the plurality of image conversion algorithms used by the image conversion unit 20 may be classified based on suitability for each image capture condition, and an appropriate image conversion algorithm may be selected based on results of the classification. For example, in terms of the lighting condition, it is assumed to be known that an image conversion algorithm A is suitable for a bright environment and an image conversion algorithm B is suitable for a dark environment. In this case, when an image capture condition for an infrared image stored in the iris image DB 4 is a bright environment, the selection unit 22 may use an image converted by using the image conversion algorithm A as the monochrome converted image D2. Thus, image capture conditions for images to be collated can be uniform, and authentication accuracy can be enhanced.

(Second Method)

In a second method, based on an attribute of the subject X, an image conversion algorithm suitable for the attribute is selected. Colors of human eyes differ from race to race. In general, eyes of Asian people are brown colors, and eyes of Western people are blue colors. Accordingly, a suitable image conversion algorithm may be predetermined for each eye color, and an appropriate image conversion algorithm may be selected, depending on information such as a race of the subject X for which the visible light image D1 is actually captured. Thus, appropriate image conversion can be performed according to the attribute of the subject.

In such a case, in actuality, the subject X may input the information such as his or her own race into the authentication device 10. In a case of immigration examination or the like, an immigration officer in charge of immigration examination of the subject X may input race-related information. Instead of inputting the information such as a race, a color of an eye of the subject X may be detected from a face image of the subject X captured by the visible light camera 2. Specifically, the image conversion unit 20 clips a region of the eye out of the visible light image D1 of the entire face of the subject X, and detects the color of the eye. Then, the selection unit 22 selects an image conversion algorithm suitable for the detected eye color. In the above-described method, monochrome conversion of the visible light image D1 may be performed by one conversion processing unit 21 that uses the algorithm selected based on the attribute of the subject X, among the plurality of conversion processing units 21 shown in FIG. 4.

[Method for Applying Plurality of Image Conversion Algorithms]

In the above-described example embodiment, the image conversion unit 20 outputs, as the monochrome converted image D2, an image converted by using one of the plurality of image conversion algorithms. Instead of such a method, the authentication device 10 may perform iris authentication by applying a plurality of image conversion algorithms.

As one method in such a case, the authentication device 10 performs monochrome conversion of the visible light image D1 by using all image conversion algorithms, and feature value extraction by the feature value extraction unit 30 and collation by the collation unit 40 are performed by using all obtained monochrome converted images. In this case, the collation unit 40 may obtain an authentication result by using a statistic such as the mean value, the maximum value, the minimum value, or the standard deviation of a plurality of obtained scores.

As another method, the authentication device 10 sequentially applies the different image conversion algorithms one by one, and terminates the processing at a point of time when a score of a certain degree of reliability is obtained. For example, the authentication device 10 performs monochrome conversion of the visible light image D1 by using a certain image conversion algorithm, performs feature value extraction and collation by using the obtained monochrome converted image D2, and calculates a score of matching degree. When the obtained score is equal to or higher than a predetermined value deemed to have a sufficient degree of reliability, the authentication device 10 adopts an authentication result obtained at that time, and terminates the processing. When the obtained score is lower than the predetermined value, the authentication device 10 performs monochrome conversion by using a next image conversion algorithm, performs feature value extraction and collation by using the obtained monochrome converted image D2, and calculates a score. In such a manner, the authentication device 10 performs comparison while changing image conversion algorithms until a score equal to or higher than the predetermined value is obtained. According to such a method, a period of time required for the authentication processing can be reduced, depending on the order in which the plurality of image conversion algorithms are applied. At that time, the order in which the plurality of image conversion algorithms are applied may be determined in consideration of image capture conditions for infrared images stored in the iris image DB 4, an attribute of the subject X, or the like.

[Examples of Image Conversion Algorithm]

Specifically, the image conversion unit 20 can use following image conversion algorithms.

(1) Algorithm of Adjusting Contrast

When monochrome conversion of a visible light image is performed by using an image conversion algorithm, the image is made to have higher contrast. Thus, a pupil in the image is easily detected, and an iris is easily scanned.

(2) Algorithm of Correcting Gamma Value

When monochrome conversion of a visible light image is performed by using an image conversion algorithm, luminance is adjusted by correcting a gamma value. Thus, a pupil in the image is easily detected, and an iris is easily scanned.

(3) Use of Deep Learning

A visible light image is converted into a monochrome image by using an image conversion model for which deep learning is used. In other words, an image conversion model that performs monochrome conversion of an input visible light image and outputs a monochrome image is learned. At a time of learning the image conversion model, correct answer data for a visible light image serving as input data is prepared beforehand. For example, an image of a face of a person captured by a visible light camera and an image of the face of the same person captured by an infrared camera may be prepared, and the former may be used as input data and the latter may be used as correct answer data. Alternatively, correct answer data may be generated by performing image processing for making it easier to extract a feature value, on a visible light image to be used as input data. At a time of learning, input data that is a prepared visible light image is inputted into the image conversion model, and parameters of the image conversion model are optimized based on a loss between the output and the correct answer data corresponding to the input data, whereby the learned image conversion model is generated. At a time of actual image conversion, monochrome conversion of an input visible light image is performed by using the learned image conversion model.

[Examples of Display by Management Device]

Figure 6:
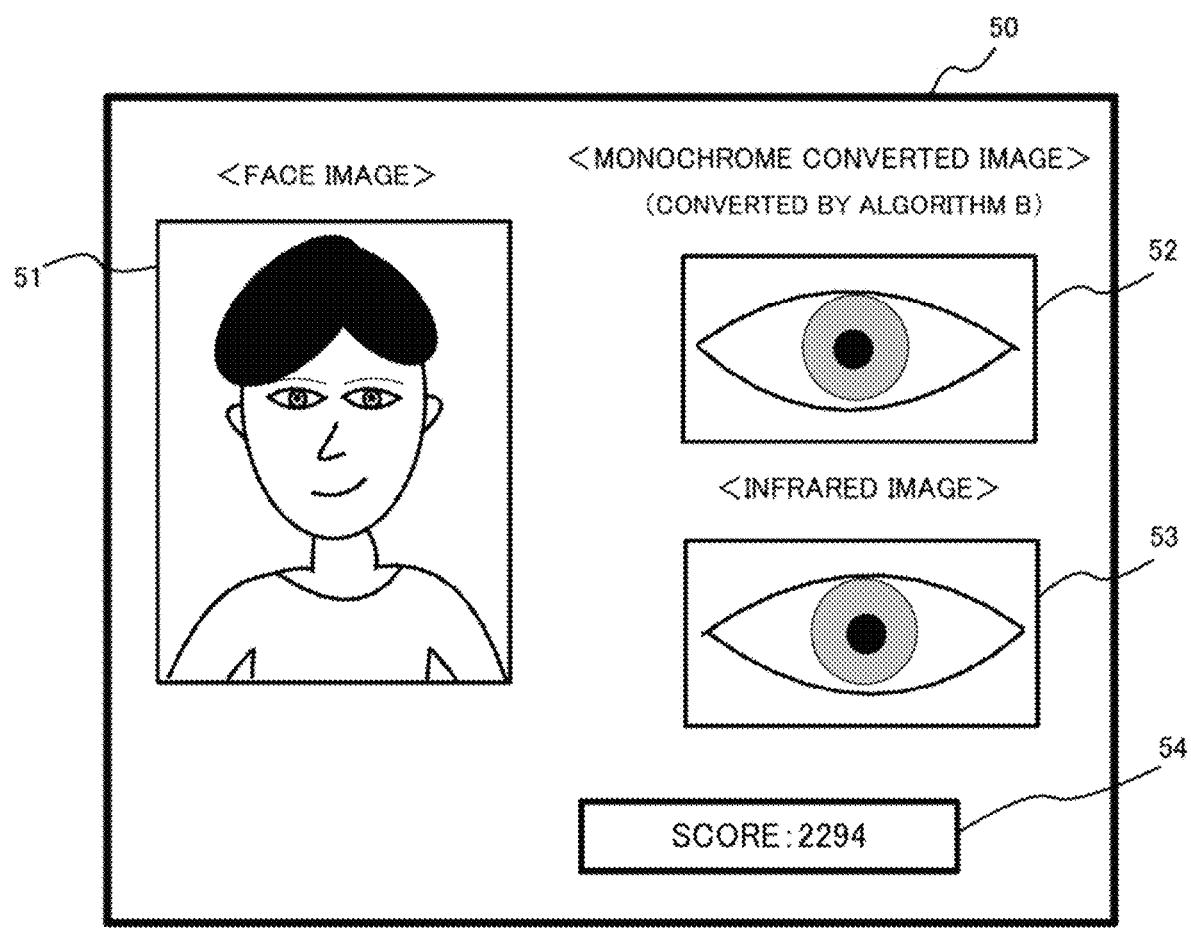
FIG. 6 shows an example of display in a management screen made by a management device.

FIG. 6 shows an example of display by the management device 5. The example in FIG. 6 is an example of display of a given subject X. A management screen 50 includes a face image 51, a monochrome converted image 52, an infrared image 53, and a score 54 of matching degree. The face image 51 is a visible light image of an entire face of the subject X captured by the visible light camera 2. The monochrome converted image 52 is an image obtained by converting a region of an eye of the subject X clipped out of the visible light image, by using a certain image conversion algorithm. Information indicating the image conversion algorithm (algorithm B in the example in FIG. 6) used for monochrome conversion is displayed near the monochrome converted image 52. The infrared image 53 is an infrared image from which a registered feature value D4 to be used in collation is extracted. The infrared image 53 is an image stored in the iris image DB 4. The score 54 indicates a matching degree between the feature value extracted from the monochrome converted image 52 and the registered feature value corresponding to the infrared image 53, and is calculated by the collation unit 40. As described above, according to the management screen 50, the administrator or the like of the authentication system 1 can easily recognize the image conversion algorithm used to convert the visible light image, the monochrome converted image obtained by the conversion, the infrared image used for collation, the score of matching degree, and the like.

Note that apart from the example in FIG. 6, the management device 5 can be designed to display a part or the whole of a course of performing iris authentication by applying an image conversion algorithm to a visible light image. For example, when a plurality of image conversion algorithms are applied to a visible light image, the management device 5 may display a name of each image conversion algorithm used in a course of processing, a score value obtained when each image conversion algorithm is used, and the like.

[Detection of Reflection]

There are some cases where a reflection of illumination or the like appears in a visible light image. A reflection refers to a fact that a light source or another image reflected by a smooth surface or the like is captured as an image. In a visible light image captured for the purpose of iris authentication, illumination, a scene around a subject, and the like may be reflected in an eye region or the like, in some cases. In such a case, it is difficult to see an iris pattern in the region of reflection in a monochrome converted image obtained by converting the visible light image, and such a region of reflection therefore cannot be used for collation. Accordingly, the feature value extraction unit 30 detects, as a region of reflection, a region where a pixel value of the input monochrome converted image D2 is equal to or higher than a predetermined value, and extracts a feature value from a region other than the region of reflection. Moreover, the collation unit 40 also performs collation by using a registered feature value in the region other than the region of reflection. Thus, a problem of reflection in cases of using a visible light image can be resolved.

Figure 7:
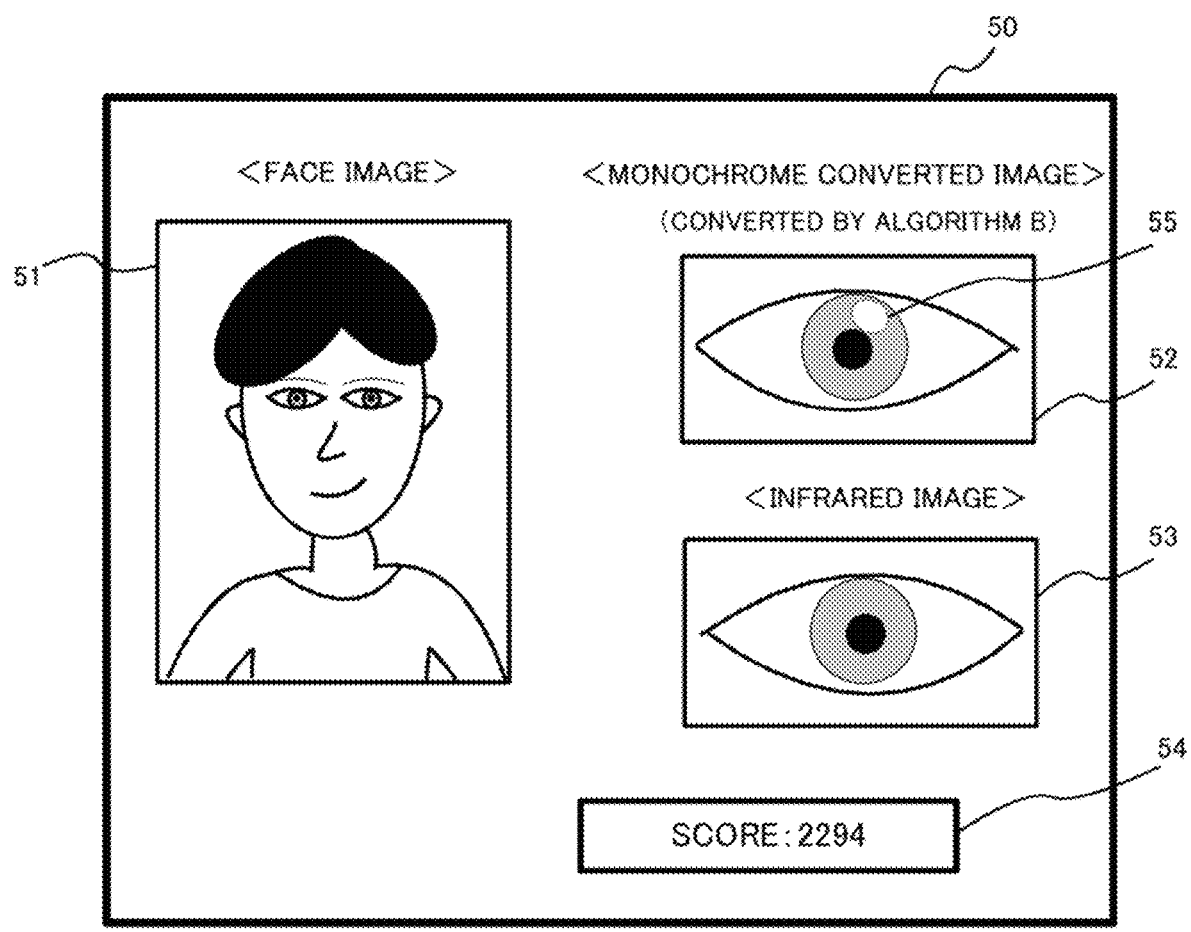
FIG. 7 shows an example in which a region of reflection is displayed in the management screen.

Note that the region of reflection detected in the monochrome converted image D2 may be displayed in a display screen of the management device 5. FIG. 7 shows an example in which the region of reflection is displayed in the management screen 50. In the example in FIG. 7, a region of reflection 55 is displayed in the monochrome converted image 52. Note that in the management screen 50, instead of displaying the region of reflection in a manner of FIG. 7, a region other than the region of reflection, that is, a region used for collation may be displayed in a highlighted manner, such as by being colored.

[Modifications]

Next, modifications of the above-described example embodiment are described. The following modifications can be applied in combination as appropriate.

(Modification 1)

In the above-described example embodiment, a visible light image is subjected to monochrome conversion, and feature value extraction is performed. However, a visible light image may be converted by using a technique other than full monochrome conversion. In a case of an iris of a Western person, a feature value can be extracted, for example, by contrast adjustment or the like, in some cases even if a visible light image is not converted into a full monochrome image (binary image). Accordingly, another type of image conversion that makes it possible to extract a feature value according to a color tone or the like of an iris may be adopted. From a similar perspective, a converted image used to be collated with an infrared image stored in the iris image DB 4 does not need to be a full monochrome image (binary image) either.

(Modification 2)

In the above-described example embodiment, a visible light image is subjected to monochrome conversion, and collation of the feature values is performed. Instead, a visible light image may be converted into each of RGB components, and collation of the feature values may be performed by using the RGB components. In such a case, the image conversion unit 20 converts a visible light image D1 into an image of each of RGB colors, the feature value extraction unit 30 extracts a feature value from the converted image of each color, and the collation unit 40 collates the extracted feature value for each color with a registered feature value stored in the iris image DB 4. The collation unit 40 generates a result of authentication, based on an obtained score for each color. For example, the collation unit 40 may determine the result of authentication, based on the mean value, the maximum value, or the like of the three obtained scores. Alternatively, the collation unit 40 may determine a result of authentication (authentication success, authentication failure, or the like) for each of the three obtained scores, and may determine a final result of authentication based on a majority of the results of authentication or the like. According to such a method, iris authentication can also be performed by using a visible light image.

(Modification 3)

In the above-described authentication system 1, only iris authentication is performed. However, face authentication may further be performed. Since iris authentication can be performed by using a visible light image according to the above-described example embodiment, both iris authentication and face authentication can be performed by using a visible light image captured by the visible light camera. Specifically, iris authentication according to the above-described example embodiment may be performed first, and when the iris authentication fails, face authentication may be performed by using a face image captured by the visible light camera. Since authentication accuracy is higher in iris authentication than in face authentication in general, face authentication may be performed first by using a face image captured by the visible light camera, and when the face authentication fails, iris authentication according to the above-described embodiment may be performed. Note that "when authentication fails" is, specifically, a case in which a score for degree of similarity obtained as a result of collation of the feature values is equal to or lower than a threshold value.

When higher security is required, two-element authentication, i.e., both face authentication and iris authentication, may be performed. In such a case, the authentication system 1 first captures a face image by using the visible light camera and performs face authentication. Next, an image of an eye is captured after focus of the visible light camera is changed, and iris authentication is performed. In general iris authentication, an infrared image is used. Accordingly, in order to perform the two-element authentication of face authentication and iris authentication, it is necessary to prepare a visible light camera and an infrared camera, and to perform image capturing individually. In this respect, if iris authentication according to the present example embodiment is used, since face authentication and iris authentication can be performed with a single visible light camera, the system can be simplified.

(Modification 4)

In the above-described example embodiment, a visible light image captured by the visible light camera 2 is collated with an infrared image registered in the iris image DB 4. Instead, a visible light image may be registered in the iris image DB 4, and a visible light image captured by the visible light camera 2 may be collated with the visible light image registered in the iris image DB 4. In such a case, as a method for collating the visible light images with each other, for example, both the visible light images are converted into each of RGB components, a feature value is extracted for each of RGB colors, and the feature values may be collated between the visible light images. In such a case, a result of authentication may be determined based on the mean value, the maximum value, or the like of obtained scores for the three colors. Alternatively, a result of authentication (authentication success, authentication failure, or the like) may be determined for each of the obtained scores for the three colors, and a final result of authentication may be determined based on a majority of the results of authentication or the like. In another method, monochrome conversion is performed on both the visible light images, and collation may be performed by using feature values obtained from the chrome images.

(Modification 5)

In the above-described example embodiment, the plurality of authentication devices 10, the iris image DB 4, and the management device 5 are connected through the network 6. Instead, a single stand-alone authentication device may be configured. In such a case, an iris image DB may be provided in a database within the single authentication device, and a management screen 50 may be displayed on a display unit.

Second Example Embodiment

Figure 8:
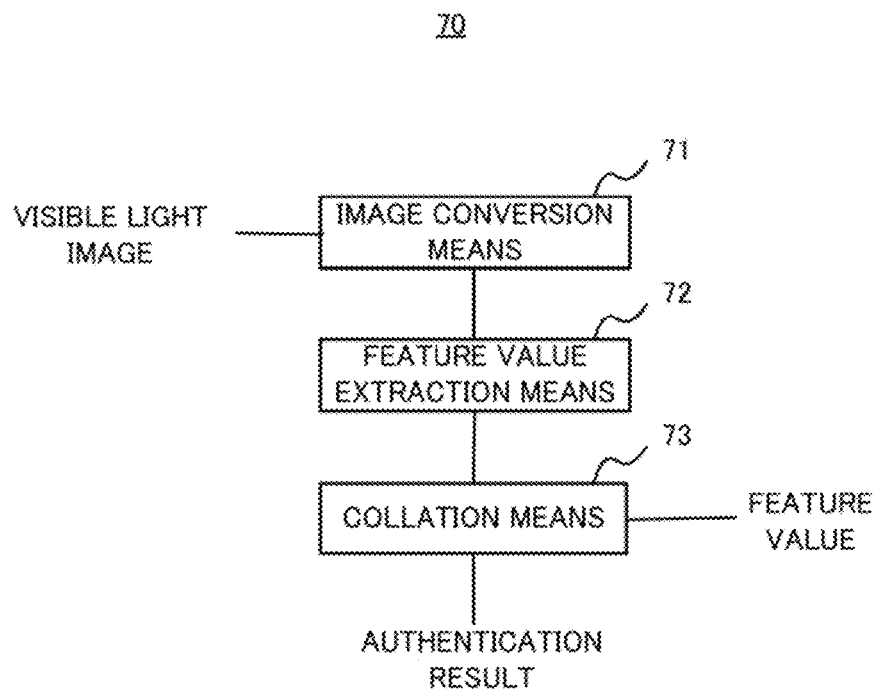
FIG. 8 is a block diagram showing a functional configuration of an authentication device according to a second example embodiment.

FIG. 8 is a block diagram showing a functional configuration of an authentication device according to a second example embodiment. The authentication device 70 includes an image conversion means 71, a feature value extraction means 72, and a collation means 73. The image conversion means 71 converts a visible light image obtained by capturing a region including an iris of a subject in visible light, and generates a converted image. The feature value extraction means 72 extracts a feature value of the converted image. The collation means 73 performs authentication of the subject by collating the extracted feature value with a feature value generated from an infrared image of an iris.

A part or all of the example embodiments described above may also be described as the following supplementary notes, but not limited thereto.

(Supplementary Note 1)

An authentication device comprising:

an image conversion means configured to convert a visible light image and generate a converted image, the visible light image obtained by capturing a region including an iris of a subject in visible light;

a feature value extraction means configured to extract a feature value of the converted image; and a collation means configured to perform authentication of the subject by collating the extracted feature value with a feature value generated from an infrared image of an iris.

(Supplementary Note 2)

The authentication device according to Supplementary note 1, wherein the image conversion means includes:

a conversion processing means configured to convert the visible light image by using a plurality of algorithms and generate a plurality of converted images; and a selection means configured to select a converted image with highest quality among the plurality of converted images, and output the selected converted image to the feature value extraction means.

(Supplementary Note 3)

The authentication device according to Supplementary note 1, wherein the image conversion means selects at least one algorithm from a plurality of algorithms based on an image capture condition for the infrared image, and converts the visible light image by using the selected algorithm.

(Supplementary Note 4)

The authentication device according to Supplementary note 1, wherein the image conversion means selects at least one algorithm from a plurality of algorithms based on an attribute of the subject, and converts the visible light image by using the selected algorithm.

(Supplementary Note 5)

The authentication device according to Supplementary note 1, wherein the image conversion means converts the visible light image by using a plurality of algorithms, and generates a plurality of converted images, wherein the feature value extraction means extracts a feature value from each of the plurality of converted images, and wherein the collation means sequentially selects the feature values extracted from the plurality of converted images, and collates the selected feature value with the feature value generated from the infrared image.

(Supplementary Note 6)

The authentication device according to any one of Supplementary notes 1 to 5, wherein the image conversion means converts the visible light image to a monochrome image.

(Supplementary Note 7)

The authentication device according to any one of Supplementary notes 1 to 6, wherein the collation means detects a region of reflection occurring due to reflection of light, based on a luminance value of each pixel in the converted image, and collates the feature values of the converted image and the infrared image in a region other than the region of reflection.

(Supplementary Note 8)

The authentication device according to Supplementary note 1, wherein the image conversion means converts the visible light image to an image in each of RGB colors, wherein the feature value extraction means extracts a feature value from the converted image in each of the RGB colors, and wherein the collation means collates each of the feature values extracted from the respective images in the RGB colors with the feature value generated from the infrared image, and performs authentication of the subject based on an obtained result.

(Supplementary Note 9)

The authentication device according to any one of Supplementary notes 1 to 8, wherein the visible light image is an image of a region including a face of the subject, and wherein the authentication device further comprises a face authentication means configured to perform face authentication of the subject by using the visible light image.

(Supplementary Note 10)

The authentication device according to Supplementary note 9, wherein the face authentication means does not perform the face authentication when a result of authentication of the subject is obtained by the collation means, and performs the face authentication when a result of authentication of the subject is not obtained by the collation means.

(Supplementary Note 11)

The authentication device according to Supplementary note 9, wherein the collation means does not perform the authentication when a result of authentication of the subject is obtained by the face authentication means, and performs the authentication when a result of authentication of the subject is not obtained by the face authentication means.

(Supplementary Note 12)

An authentication method comprising:

converting a visible light image and generating a converted image, the visible light image obtained by capturing a region including an iris of a subject in visible light:

extracting a feature value of the converted image; and performing authentication of the subject by collating the extracted feature value with a feature value generated from an infrared image of an iris.

(Supplementary Note 13)

A recording medium recording a program, the program causing a computer to execute processing comprising:

converting a visible light image and generating a converted image, the visible light image obtained by capturing a region including an iris of a subject in visible light:

extracting a feature value of the converted image; and performing authentication of the subject by collating the extracted feature value with a feature value generated from an infrared image of an iris.

While this disclosure has been described with reference to example embodiments and examples, this disclosure is not limited to the above example embodiments and examples. Various changes that can be understood by those skilled in the art within the scope of this disclosure can be made in the configuration and details of this disclosure.

DESCRIPTION OF SYMBOLS

1 Authentication system
2 Visible light camera
4 Iris image database
5 Management device
6 Network
10 Authentication device
11 IF (InterFace)
12 Processor
13 Memory
14 Recording medium
15 Database (DB)
20 Image conversion unit
21 Conversion processing unit
22 Selection unit
30 Feature value extraction unit
40 Collation unit
50 Management screen
51 Face image
52 Monochrome converted image
70 Authentication device
71 Image conversion means
72 Feature value extraction means
73 Collation means
53 Infrared image
54 Score
D1 Visible light image
D2 Monochrome converted image
D3 Feature value

What is claimed is:

1. An authentication device comprising:
a memory configured to store instructions; and
one or more processors configured to execute the instructions to:
convert a visible light image and generate a converted image, the visible light image obtained by capturing a region including an iris of a subject in visible light;
extract a feature value of the converted image; and
perform authentication of the subject by collating the extracted feature value with a feature value generated from an infrared image of an iris.

2. The authentication device according to claim 1, wherein the one or more processors are configured to:
convert the visible light image by using a plurality of algorithms and generate a plurality of converted images; and
select a converted image with highest quality among the plurality of converted images, and output the selected converted image.

3. The authentication device according to claim 1, wherein the one or more processors are configured to select at least one algorithm from a plurality of algorithms based on an image capture condition for the infrared image, and convert the visible light image by using the selected algorithm.

4. The authentication device according to claim 1, wherein the one or more processors are configured to select at least one algorithm from a plurality of algorithms based on an attribute of the subject, and convert the visible light image by using the selected algorithm.

5. The authentication device according to claim 1,
wherein the one or more processors convert the visible light image by using a plurality of algorithms, and generate a plurality of converted images,
wherein the one or more processors extract a feature value from each of the plurality of converted images, and
wherein the one or more processors select the feature values extracted from the plurality of converted images, and collate the selected feature value with the feature value generated from the infrared image.

6. The authentication device according to claim 1, wherein the one or more processors convert the visible light image to a monochrome image.

7. The authentication device according to claim 1, wherein the one or more processors detect a region of reflection occurring due to reflection of light, based on a luminance value of each pixel in the converted image, and collate the feature values of the converted image and the infrared image in a region other than the region of reflection.

8. The authentication device according to claim 1,
wherein the one or more processors convert the visible light image to an image in each of RGB colors,
wherein the one or more processors extract a feature value from the converted image in each of the RGB colors, and
wherein the one or more processors collate each of the feature values extracted from the respective images in the RGB colors with the feature value generated from the infrared image, and perform authentication of the subject based on an obtained result.

9. The authentication device according to claim 1,
wherein the visible light image is an image of a region including a face of the subject, and
wherein the one or more processors are further configured to perform face authentication of the subject by using the visible light image.

10. The authentication device according to claim 9, wherein the one or more processors do not perform the face authentication when a result of authentication of the subject is obtained, and perform the face authentication when a result of authentication of the subject is not obtained.

11. The authentication device according to claim 9, wherein the one or more processors do not perform the authentication when a result of authentication of the subject is obtained by the face authentication, and performs the authentication when a result of authentication of the subject is not obtained by the face authentication.

12. An authentication method comprising:
converting a visible light image and generating a converted image, the visible light image obtained by capturing a region including an iris of a subject in visible light;
extracting a feature value of the converted image; and
performing authentication of the subject by collating the extracted feature value with a feature value generated from an infrared image of an iris.

13. A non-transitory computer-readable recording medium recording a program, the program causing a computer to execute processing comprising:
converting a visible light image and generating a converted image, the visible light image obtained by capturing a region including an iris of a subject in visible light;
extracting a feature value of the converted image; and
performing authentication of the subject by collating the extracted feature value with a feature value generated from an infrared image of an iris.

* * * * *